(12) United States Patent
Fukuoka et al.

(10) Patent No.: US 10,758,438 B2
(45) Date of Patent: Sep. 1, 2020

(54) MOBILITY VEHICLE, MOBILITY VEHICLE MAINTENANCE SYSTEM, AND SERVER UNIT

(71) Applicant: WHILL K.K., Kanagawa (JP)

(72) Inventors: Muneaki Fukuoka, Kanagawa (JP); Kazumichi Shirai, Kanagawa (JP)

(73) Assignee: WHILL K.K., Kanagawa (JP)

( * ) Notice: Subject to any disclaimer, the term of this patent is extended or adjusted under 35 U.S.C. 154(b) by 211 days.

(21) Appl. No.: 15/928,267

(22) Filed: Mar. 22, 2018

(65) Prior Publication Data

US 2018/0207040 A1 Jul. 26, 2018

Related U.S. Application Data

(63) Continuation of application No. PCT/JP2016/078734, filed on Sep. 28, 2016.

(30) Foreign Application Priority Data

Sep. 29, 2015 (JP) ................................ 2015-191217

(51) Int. Cl.
*A61G 5/10* (2006.01)
*H04W 80/06* (2009.01)
(Continued)

(52) U.S. Cl.
CPC ................. *A61G 5/10* (2013.01); *A61G 5/04* (2013.01); *G07C 5/008* (2013.01); *G07C 5/02* (2013.01);
(Continued)

(58) Field of Classification Search
CPC ... A61G 5/10; A61G 5/04; G08G 1/00; H04Q 9/00; H04M 11/00; H04W 76/10;
(Continued)

(56) References Cited

U.S. PATENT DOCUMENTS

| 2006/0155841 A1 | 7/2006 | Okude et al. |
| 2015/0149221 A1 | 5/2015 | Tremblay |
| 2018/0072177 A1 | 3/2018 | Tremblay |

FOREIGN PATENT DOCUMENTS

| CN | 101219082 | 7/2008 |
| EP | 2557432 A1 | 2/2013 |

(Continued)

*Primary Examiner* — Rodney A Butler
(74) *Attorney, Agent, or Firm* — BainwoodHuang

(57) ABSTRACT

A mobility vehicle includes the following elements: a moving mechanism which moves a vehicle body; an information acquisition unit which acquires device information; a wireless communication unit capable of communicating via a communication network; and a determination unit which determines whether or not an event for which communication using connection-type communication with a server unit should be started has taken place, wherein the wireless communication unit transmits a connection establishment request using the connection-type communication to the server unit when the determination unit determines that the event has taken place, and the wireless communication unit transmits, to the server unit, the device information acquired by the information acquisition unit using connectionless-type communication when the determination unit determines that the event has not taken place.

9 Claims, 9 Drawing Sheets

(51) Int. Cl.
  *G08G 1/00* (2006.01)
  *H04Q 9/00* (2006.01)
  *H04M 11/00* (2006.01)
  *H04W 76/10* (2018.01)
  *H04W 52/02* (2009.01)
  *A61G 5/04* (2013.01)
  *G07C 5/00* (2006.01)
  *G07C 5/02* (2006.01)
  *H04B 1/38* (2015.01)
  *H04B 1/3822* (2015.01)

(52) U.S. Cl.
  CPC ............ *G08G 1/00* (2013.01); *H04B 1/3822* (2013.01); *H04M 11/00* (2013.01); *H04Q 9/00* (2013.01); *H04W 52/0254* (2013.01); *H04W 52/0261* (2013.01); *H04W 76/10* (2018.02); *H04W 80/06* (2013.01); *Y02D 70/00* (2018.01); *Y02D 70/1262* (2018.01)

(58) Field of Classification Search
  CPC ......... H04W 52/0254; H04W 52/0261; H04W 80/06; G07C 5/008; G07C 5/02; H04B 1/3822; Y02D 70/00; Y02D 70/1262
  See application file for complete search history.

(56) References Cited

FOREIGN PATENT DOCUMENTS

| | | | | |
|---|---|---|---|---|
| JP | 2001304906 | A | 10/2001 | |
| JP | 2002197569 | A | 7/2002 | |
| JP | 2005303380 | A | 10/2005 | |
| JP | 2006048232 | A | 2/2006 | |
| JP | 2006203507 | A | 8/2006 | |
| JP | 2011159299 | A | 8/2011 | |
| JP | 2013037501 | A | 2/2013 | |
| JP | 2013042243 | A | 2/2013 | |
| WO | WO-2019039191 | A1 * | 2/2019 | .............. H04W 8/22 |
| WO | WO-2019102690 | A1 * | 5/2019 | .............. G01C 21/26 |

* cited by examiner

MOBILITY VEHICLE, MOBILITY VEHICLE MAINTENANCE SYSTEM, AND SERVER UNIT

CROSS-REFERENCE TO RELATED APPLICATIONS

This application is a Continuation Application of International Application No. PCT/JP2016/078734 filed on Sep. 28, 2016, which claims priority to Japanese Patent Application No. 2015-191217 filed on Sep. 29, 2015. The Contents of International Application No. PCT/JP2016/078734 and Japanese Patent Application No. 2015-191217 are hereby incorporated herein by reference in their entirety.

TECHNICAL FIELD

The present invention relates to a mobility vehicle.

BACKGROUND ART

There is a known system in which data is transmitted from a plurality of terminal devices existing in a remote place to a server unit and the data transmitted from the plurality of terminal devices are acquired in the server unit (refer to, for example, PTL 1). PTL 1 discloses an automatic meter checking system for transmitting meter data that has been acquired from a meter by a communication terminal device to a center device using a wireless communication method.

In the automatic meter checking system disclosed in PTL 1, in order to perform efficient data acquisition, the User Datagram Protocol (UDP), which has higher data transmission efficiency than the Transmission Control Protocol (TCP), is used as a communication protocol for the transport layer.

CITATION LIST

Patent Literature

{PTL 1}
Japanese Unexamined Patent Application, Publication No. 2005-303380

SUMMARY OF INVENTION

In order to achieve the above-described object, the present invention provides the following solutions.

A mobility vehicle according to a first aspect of the present invention includes: a moving mechanism which moves a vehicle body; an information acquisition unit which acquires device information regarding the mobility vehicle; a communication unit capable of communicating via a communication network; and a determination unit which determines whether or not an event for which communication based on connection-type communication with an external device should be started has taken place, wherein the external device is connected to the communication network, wherein the communication unit transmits an establishment request for establishing a connection using the connection-type communication to the external device when the determination unit determines that the event has taken place, and the communication unit transmits, to the communication network, the device information acquired by the information acquisition unit using connectionless-type communication when the determination unit determines that the event has not taken place.

A mobility vehicle maintenance system according to a second aspect of the present invention includes: the above-described mobility vehicle; and a server unit as the external device which has a storage unit that stores data to be transmitted to the mobility vehicle using the connection-type communication, wherein the server unit transmits the data stored in the storage unit to the mobility vehicle upon receiving, from the mobility vehicle, the establishment request for a connection using the connection-type communication.

A server unit according to a third aspect of the present invention includes: a storage unit which stores data to be transmitted to a mobility vehicle using connection-type communication; and a server control unit which transmits the data stored in the storage unit to the mobility vehicle using the connection-type communication upon receiving, from the mobility vehicle, an establishment request for establishing a connection using the connection-type communication, wherein upon receiving predetermined data transmitted from a particular terminal or the predetermined data input from a particular input device, the server unit stores data based on the predetermined data as the data to be transmitted.

DESCRIPTION OF EMBODIMENTS

A maintenance system 500 according to an embodiment of the present invention will now be described with reference to the drawings. The maintenance system 500 according to this embodiment is a system for acquiring device information, including position information, from a plurality of electric mobility vehicles 100 to a server unit 200 and for transmitting, from the server unit 200 to the electric mobility vehicles 100, data, such as a control program for controlling the electric mobility vehicles 100, an updated program thereof, and so forth, thus controlling and maintaining the electric mobility vehicles 100.

Figure 1:
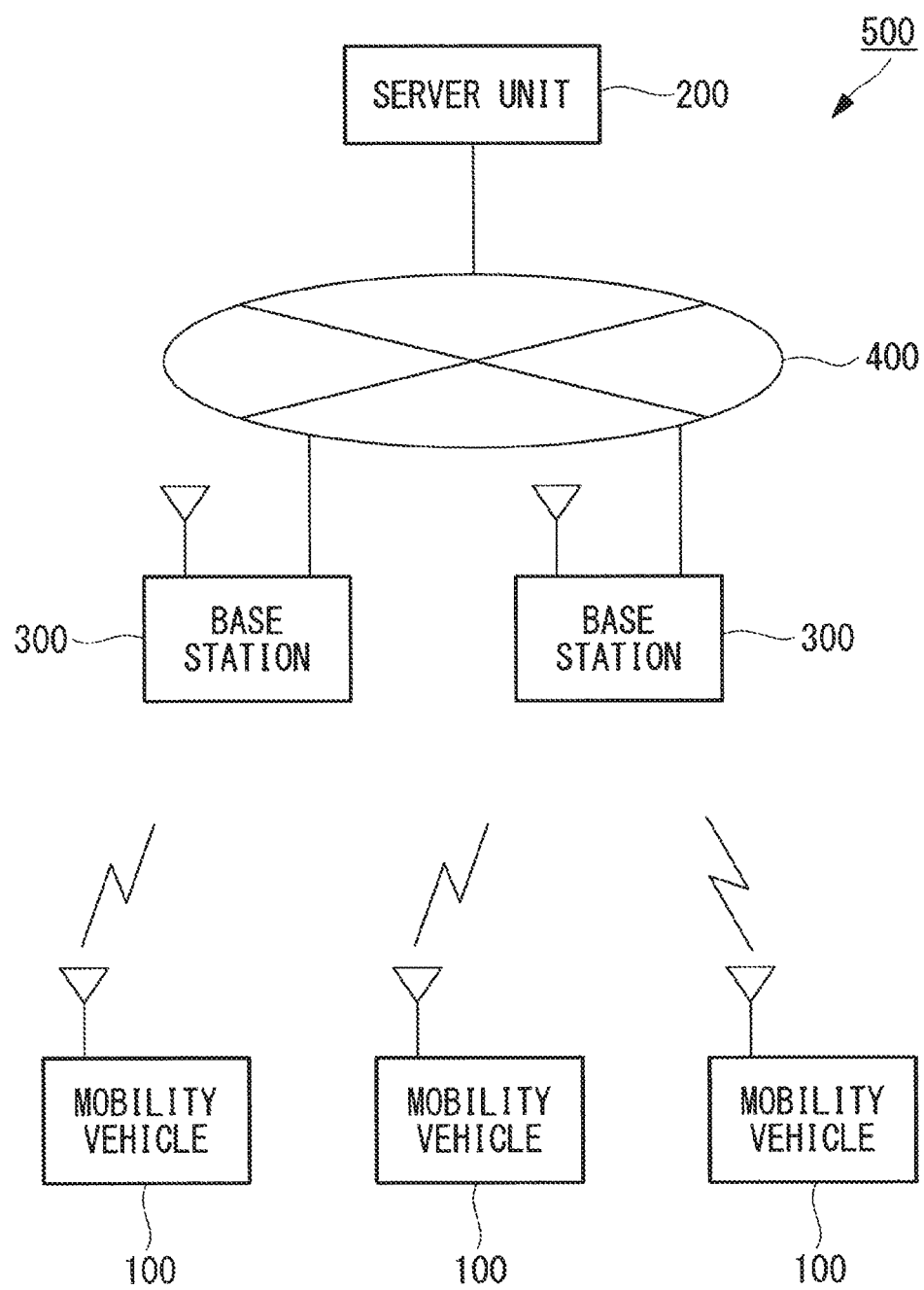
FIG. 1 is a configuration diagram showing a maintenance system according to an embodiment of the present invention.

As shown in FIG. 1, the maintenance system 500 includes: the plurality of electric mobility vehicles 100; the server unit (external device) 200; a plurality of base stations 300 capable of communicating with the plurality of electric mobility vehicles 100 by wireless communication; and a communication network 400 for connecting the server unit 200 and the base stations 300 so that they can communicate with each other.

Note that various types of communication methods, such as 3G (3rd Generation) and LTE (Long Term Evolution), can be employed as the wireless communication method between the electric mobility vehicles 100 and the base stations 300.

Next, the electric mobility vehicles 100 shown in FIG. 1 will be described in more detail.

Figure 2:
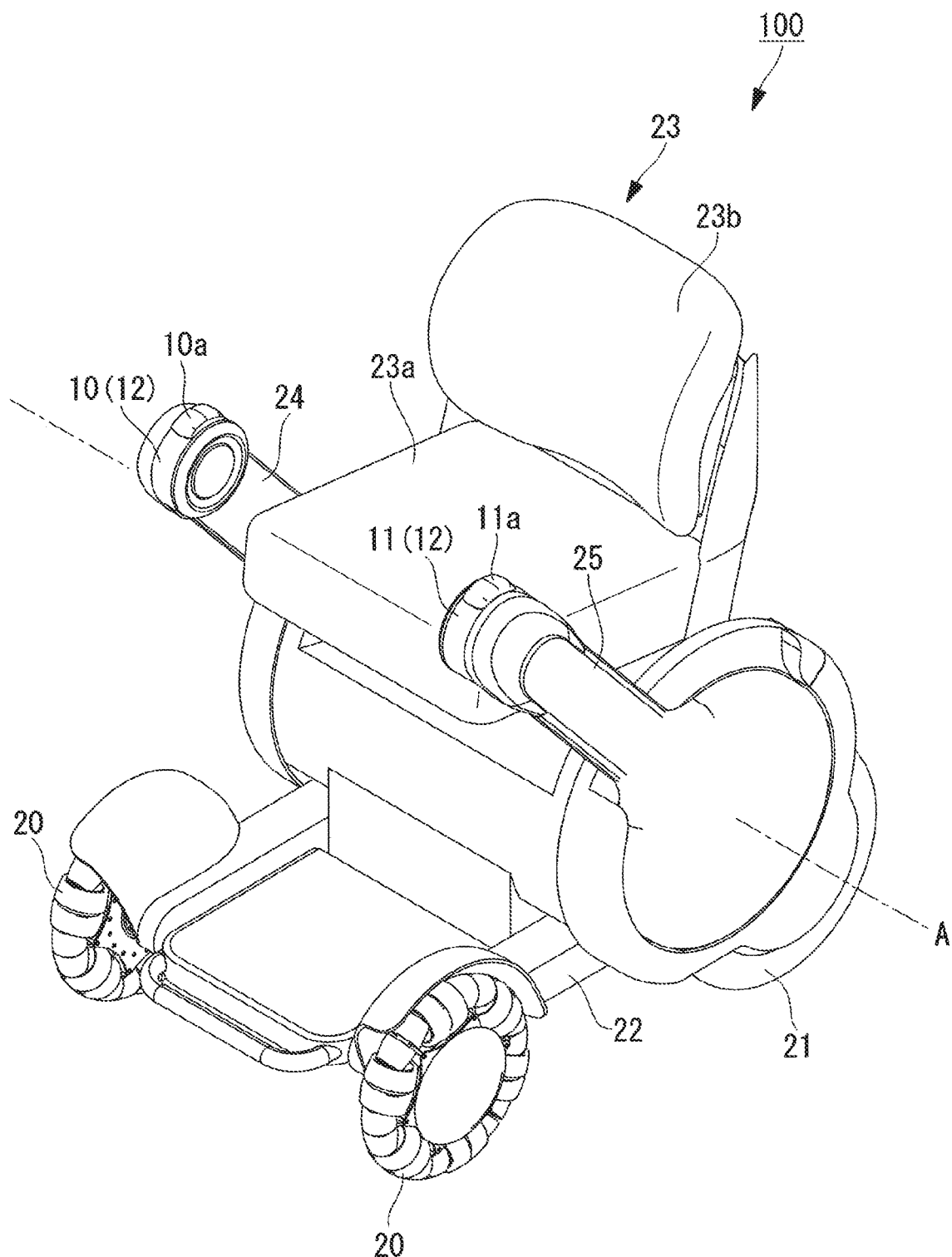
FIG. 2 is a perspective view showing an electric mobility vehicle in FIG. 1.

As shown in the perspective view of FIG. 2, each of the electric mobility vehicles 100 of this embodiment includes: an operation input unit 12 for accepting a plurality of types of operation inputs input by an operator; a front wheel 20; a rear wheel 21; a vehicle body frame 22; a seat 23 having a seating face 23a and a back rest 23b; and a pair of handles 24 and 25.

Figure 3:
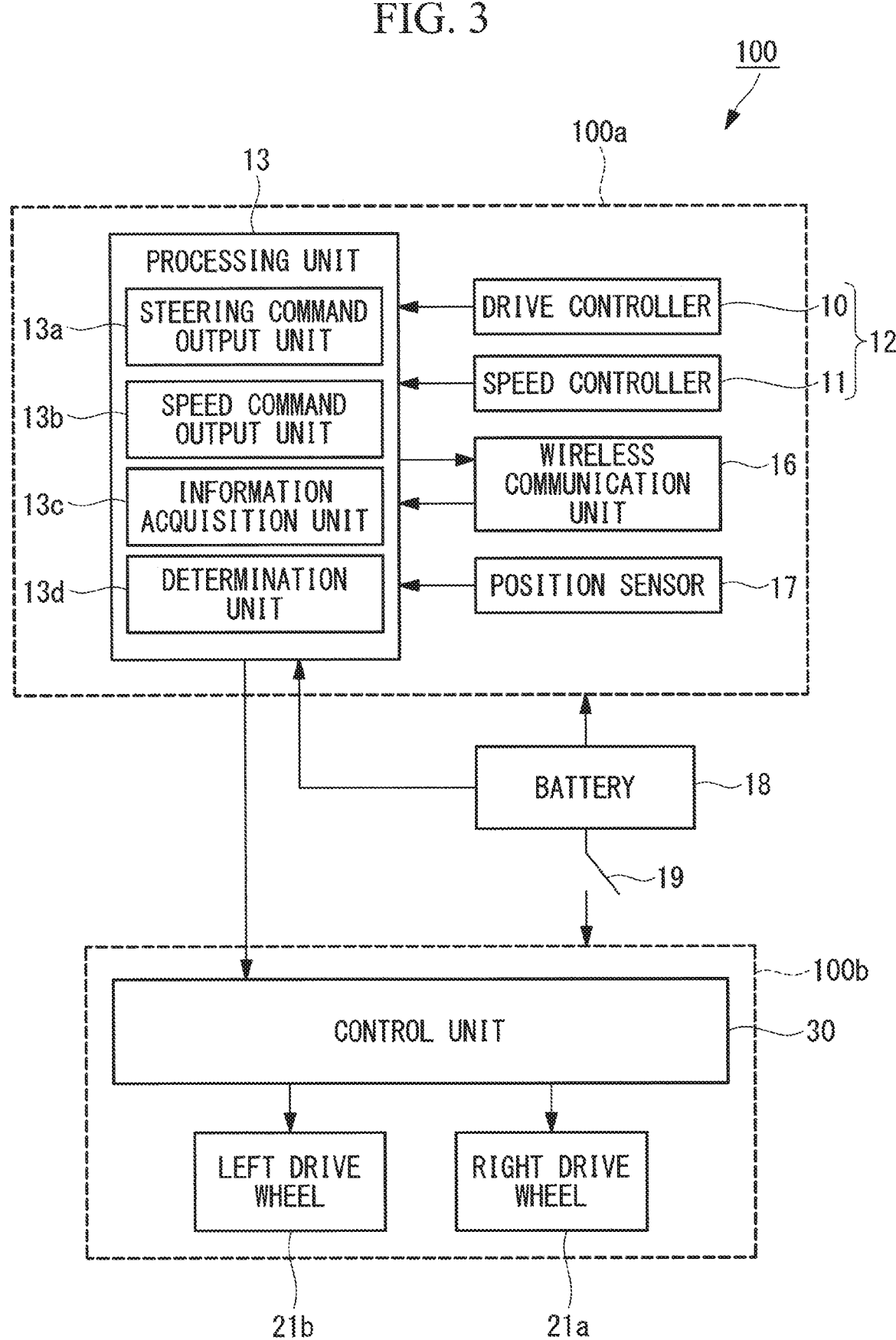
FIG. 3 is a block diagram showing a functional configuration of the electric mobility vehicle in FIG. 1.

Here, the rear wheel 21 is composed of a right drive wheel 21a and a left drive wheel 21b (refer to FIG. 3). The right drive wheel 21a and the left drive wheel 21b are drive wheels that are driven by a pair of electric motors (not shown in the figure), respectively.

In addition, as shown in the block diagram of FIG. 3, the electric mobility vehicle 100 of this embodiment further includes: a processing unit 13; a wireless communication unit 16; a position sensor 17; a battery (power supply unit) 18; a power switch 19; and a control unit 30.

Note that the operation input unit 12, the processing unit 13, the wireless communication unit 16, and the position sensor 17 are attached to the vehicle body frame 22 shown in FIG. 2, and they are referred to as a vehicle body 100a.

On the other hand, the control unit 30, the right drive wheel 21a, and the left drive wheel 21b are referred to as a moving mechanism 100b. The moving mechanism 100b is a mechanism for moving the vehicle body 100a to an arbitrary position.

Each of the units provided in the electric mobility vehicle 100 will be described.

As shown in FIGS. 2 and 3, the operation input unit 12 provided in the electric mobility vehicle 100 has a drive controller 10 attached to the handle 24, which is arranged on the right as viewed towards the moving direction, and a speed controller 11 attached to the handle 25, which is arranged on the left as viewed towards the moving direction.

An driver of the electric mobility vehicle 100 displaces, in the direction of an axle A, a drive operating member 10a held at a neutral position by a biasing mechanism (not shown in the figure), thereby inputting the displacement with respect to the neutral position from the drive controller 10 to a steering command output unit 13a of the processing unit 13. The steering command output unit 13a generates a steering command signal according to the input displacement and outputs it to the control unit 30.

In addition, the driver of the electric mobility vehicle 100 displaces, in a moving direction orthogonal to the axle A, the drive operating member 10a held at the neutral position by the biasing mechanism (not shown in the figure), thereby inputting the displacement with respect to the neutral position from the drive controller 10 to a speed command output unit 13b of the processing unit 13. The speed command output unit 13b generates a speed command signal according to the input displacement and outputs it to the control unit 30.

The control unit 30 controls the right drive wheel 21a and the left drive wheel 21b on the basis of the steering command signal output from the steering command output unit 13a and the speed command signal output from the speed command output unit 13b.

In addition, the driver of the electric mobility vehicle 100 displaces, in the moving direction orthogonal to the axle A, a speed operating member 11a held at a neutral position by a biasing mechanism (not shown in the figure), thereby setting the maximum speed of the speed command signal output by the speed command output unit 13b. The speed command signal output by the speed command output unit 13b is adjusted so as not to exceed the set maximum speed.

The processing unit 13 has the steering command output unit 13a, the speed command output unit 13b, an information acquisition unit 13c, and a determination unit 13d. The processing unit 13 includes a time measuring function capable of measuring current clock time and elapsed time from a specified time point (e.g., the time point at which the power switch 19 is turned off).

The information acquisition unit 13c possessed by the processing unit 13 acquires device information, including position information (information indicating the latitude and the longitude) detected by the position sensor 17. The information acquisition unit 13c acquires, as device information, information on the level of the remaining power that can be supplied to the moving mechanism 100b from the battery 18, which can be charged by an external power supply (not shown in the figure). In addition, the information acquisition unit 13c acquires, as device information, drive parameters set by the control unit 30. The device information may be information regarding the battery state or information regarding operation input which is made using the controllers 10, 11.

Here, the drive parameters are parameters including the upper limit of the forward-moving speed, the upper limit of the backward-moving speed, the upper limit of the forward-moving acceleration, and the upper limit of the backward-moving acceleration in a case where the electric mobility vehicle 100 is moved by driving the right drive wheel 21a and the left drive wheel 21b.

The control unit 30 drives the right drive wheel 21a and the left drive wheel 21b at the speed according to the speed command signal output from the speed command output unit 13b but restricts the drive speed and drive acceleration of each of the right drive wheel 21a and the left drive wheel 21b so as not to exceed the upper limits indicated by the drive parameters.

The determination unit 13d possessed by the processing unit 13 determines whether or not an event, for which communication based on connection-type communication with the server unit 200 should be started, has taken place. Here, from among the TCP and the UDP, which are communication protocols for the transport layer that can be performed by the wireless communication unit 16, the connection-type communication refers to communication using the TCP.

If the determination unit 13d determines that an event, for which communication based on the connection-type communication with the server unit 200 should be started, has taken place, the determination unit 13d notifies the wireless communication unit 16 that communication based on the connection-type communication with the server unit 200 should be started.

In this embodiment, events, for which communication based on the connection-type communication with the server unit 200 should be started, refer to the following events:

(1) Event in which the power switch 19 is turned on and the supply of power from the battery 18 to the moving mechanism 100*b* is started;

(2) Event in which the clock time measured by the processing unit 13 indicates a predetermined clock time; and (3) Event in which a predetermined abnormality has occurred in the electric mobility vehicle 100.

Here, the predetermined clock time in (2) refers to, for example, a clock time in a day (e.g., 23:00) or a plurality of clock times in a day (e.g., 12:00 and 23:00). Alternatively, the predetermined clock time in (2) refers to, for example, the clock time after a certain period of time has elapsed from the clock time at which the power switch 19 is switched from the on state to the off state (e.g., the clock time five hours after the time clock at which the power switch 19 is switched to the off state). Alternatively, the predetermined clock time in (2) refers to, for example, a clock time in a week (e.g., 23:00 on Sunday) or a plurality of clock times in a week (e.g., 12:00 on Wednesday and 23:00 on Sunday).

Furthermore, the predetermined abnormality in (3) refers to, for example, a state in which the position detected by the position sensor 17 does not change even when the control unit 30 controls the right drive wheel 21*a* and the left drive wheel 21*b* in order to move the vehicle body 100*a* of the electric mobility vehicle 100. In addition, the predetermined abnormality in (3) may include a state in which the processing unit 13 is notified of an abnormality in each element, such as the position sensor 17 or the battery 18.

The battery 18 can be charged by the external power supply (not shown in the figure), and the electric power stored by charging is supplied to each unit in the vehicle body 100*a* and each unit in the moving mechanism 100*b*.

The battery 18 is configured to always supply electric power to the vehicle body 100*a*. On the other hand, the battery 18 supplies electric power to the moving mechanism 100*b* when the power switch 19 is turned on by the driver of the electric mobility vehicle 100 and shuts off the supply of power to the moving mechanism 100*b* when the power switch 19 is turned off by the driver of the electric mobility vehicle 100.

The battery 18 is provided with a mechanism for detecting the level of remaining power stored therein and notifies the processing unit 13 of information on the remaining power level.

Next, the wireless communication unit 16 shown in FIG. 3 will be described with reference to FIG. 4. The wireless communication unit 16 is a device for wirelessly communicating with the server unit 200 via the base station 300 and communication network 400.

The wireless communication unit 16 can be a hardware module composed of hardware that can perform each of the functions described below. Alternatively, the wireless communication unit 16 can be a software module for executing, by means of an arithmetic operation unit (not shown in the figure), a control program for implementing each of the functions. Alternatively, the wireless communication unit 16 may implement, for example, some of the functions as a hardware module and implement the other functions as a software module.

Figure 4:
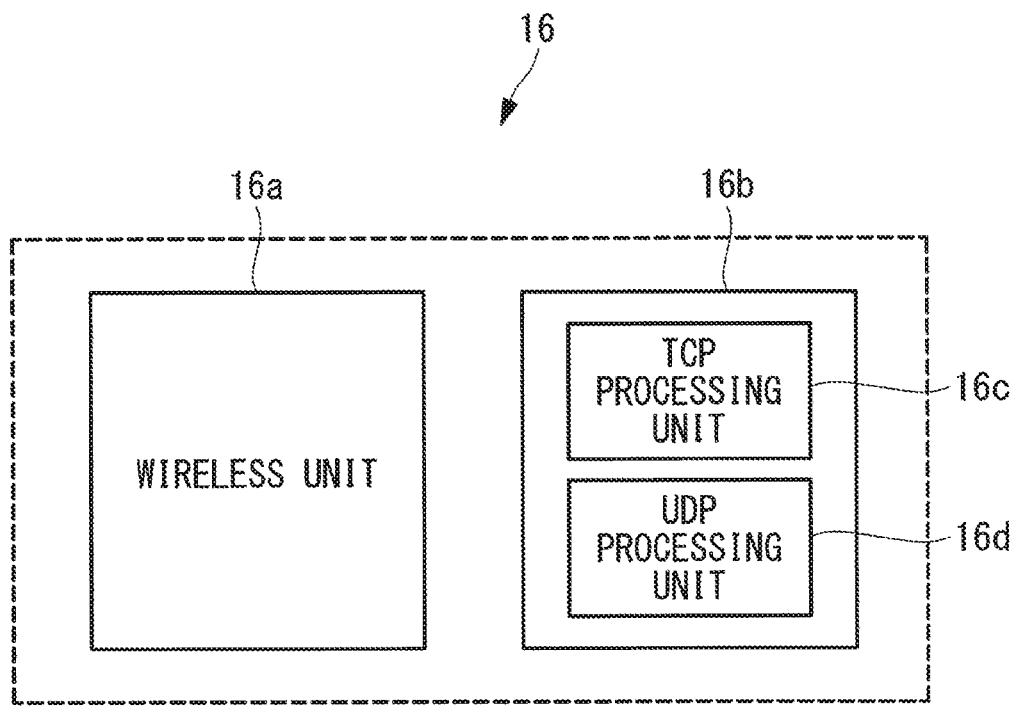
FIG. 4 is a block diagram showing a functional configuration of a wireless communication unit in FIG. 3.

As shown in FIG. 4, the wireless communication unit 16 has a wireless unit 16*a* and a packet processing unit 16*b*. The wireless unit 16*a* demodulates a wirelessly modulated signal transmitted from the server unit 200 to the electric mobility vehicle 100 via the base station 300 to generate packet data and outputs the packet data to the packet processing unit 16*b*. In addition, the wireless unit 16*a* generates a wirelessly modulated signal by modulating packet data to be transmitted from the electric mobility vehicle 100 to the server unit 200 via the base station 300 and transmits the signal to the server unit 200 via the base station 300.

The packet processing unit 16*b* extracts a data body from the packet data that has been received and demodulated by the wireless unit 16*a* and outputs the data body to the processing unit 13 and also adds, to the data body output from the processing unit 13, a header required for communication processing in each of the layers (application layer, transport layer, Internet layer, and network interface layer) of TCP/IP (Transmission Control Protocol/Internet Protocol) to generate packet data.

In the packet processing unit 16*b* of this embodiment, a TCP processing unit 16*c* for using TCP as a communication protocol for the transport layer and a UDP processing unit 16*d* for using UDP as a communication protocol for the transport layer are implemented.

TCP is a communication protocol referred to as a connection type in which data communication is started after a connection has been established with a communication partner with which communication is to be performed. TCP has high communication reliability because, in a case where data reception confirmation is not returned from the data transmission destination, it takes a procedure in which new data is not transmitted but the data for which no reception confirmation is returned is re-transmitted from the transmission source to the transmission destination.

On the other hand, UDP is a communication protocol referred to as a connectionless type in which data communication is started without establishing a connection with the communication partner with which communication is to be performed. UDP has high communication efficiency because it takes a procedure for serially transmitting data without requesting data reception confirmation from the data transmission destination.

Comparing TCP with UDP, the size of the header added to a data body by the packet processing unit 16*b* is 20 bytes in TCP and 8 bytes in UDP. For this reason, in a case where the size of the data body to be added to packet data is small (e.g., on the order of 10 to 100 bytes), TCP has a higher ratio of the size of the header with respect to the size of the data body.

Note that the header added to the data body by the packet processing unit 16*b* includes the communication protocol header for each of the application layer, the Internet layer, and the network interface layer, besides the communication protocol header for the transport layer.

In addition, comparing TCP with UDP, TCP requires communication processing for connection establishment and data reception confirmation, whereas UDP does not require communication processing for connection establishment and data reception confirmation. For this reason, the communication time required to perform communication of a data body of the same size is longer in TCP than in UDP. Likewise, the total amount of communication data required to perform communication of a data body of the same size is larger in TCP than in UDP.

The wireless communication unit 16 of this embodiment uses TCP and UDP as the communication protocol for the transport layer by switching between TCP and UDP taking into account the above-described feature differences between TCP and UDP.

Next, a procedure for data communication between the electric mobility vehicle 100 and the server unit 200 will be described with reference to FIGS. 5 to 8.

Figure 5:
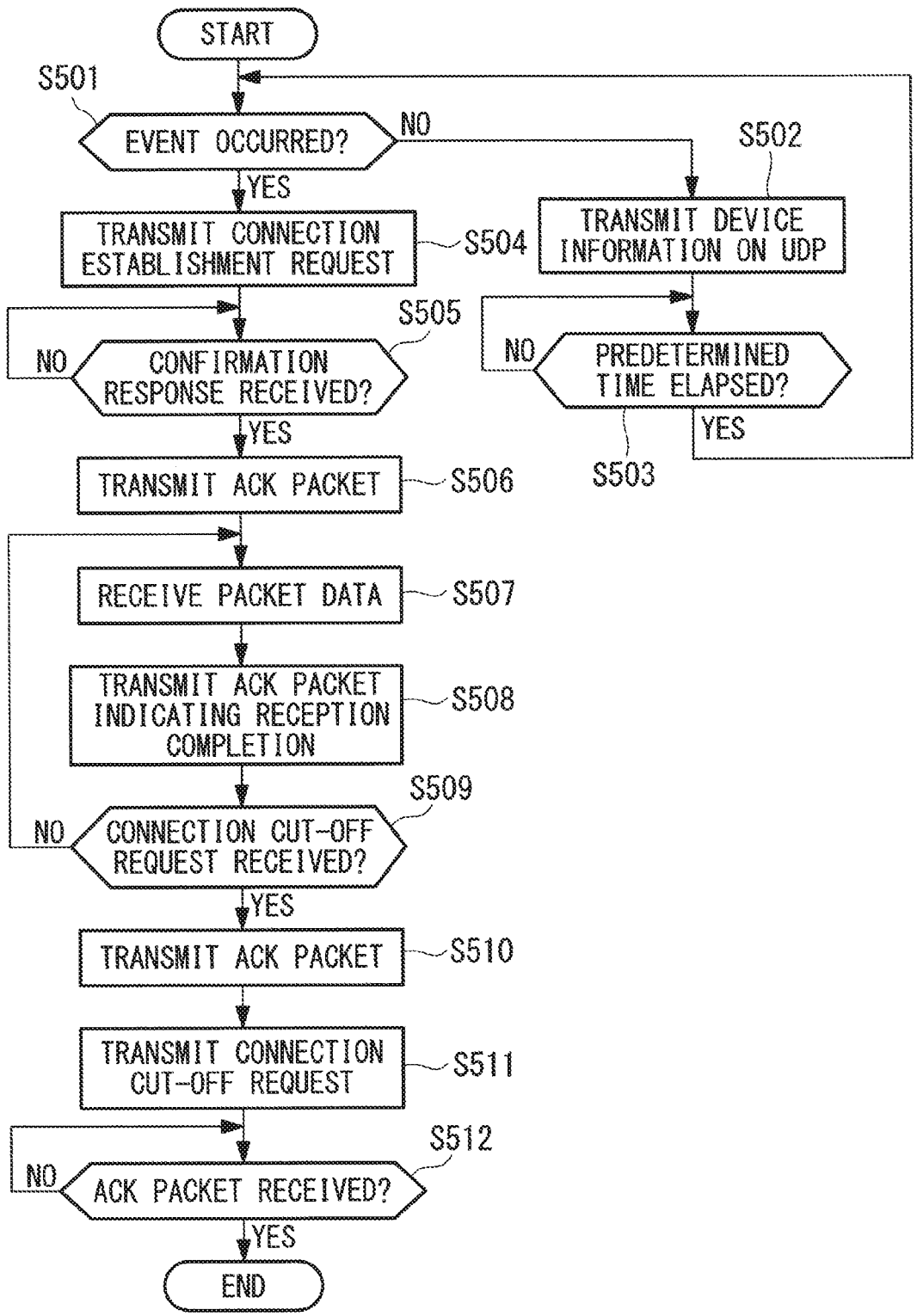
FIG. 5 is a flowchart showing processing carried out by the wireless communication unit of the electric mobility vehicle in a case where data is transmitted from a server unit.
Figure 6:
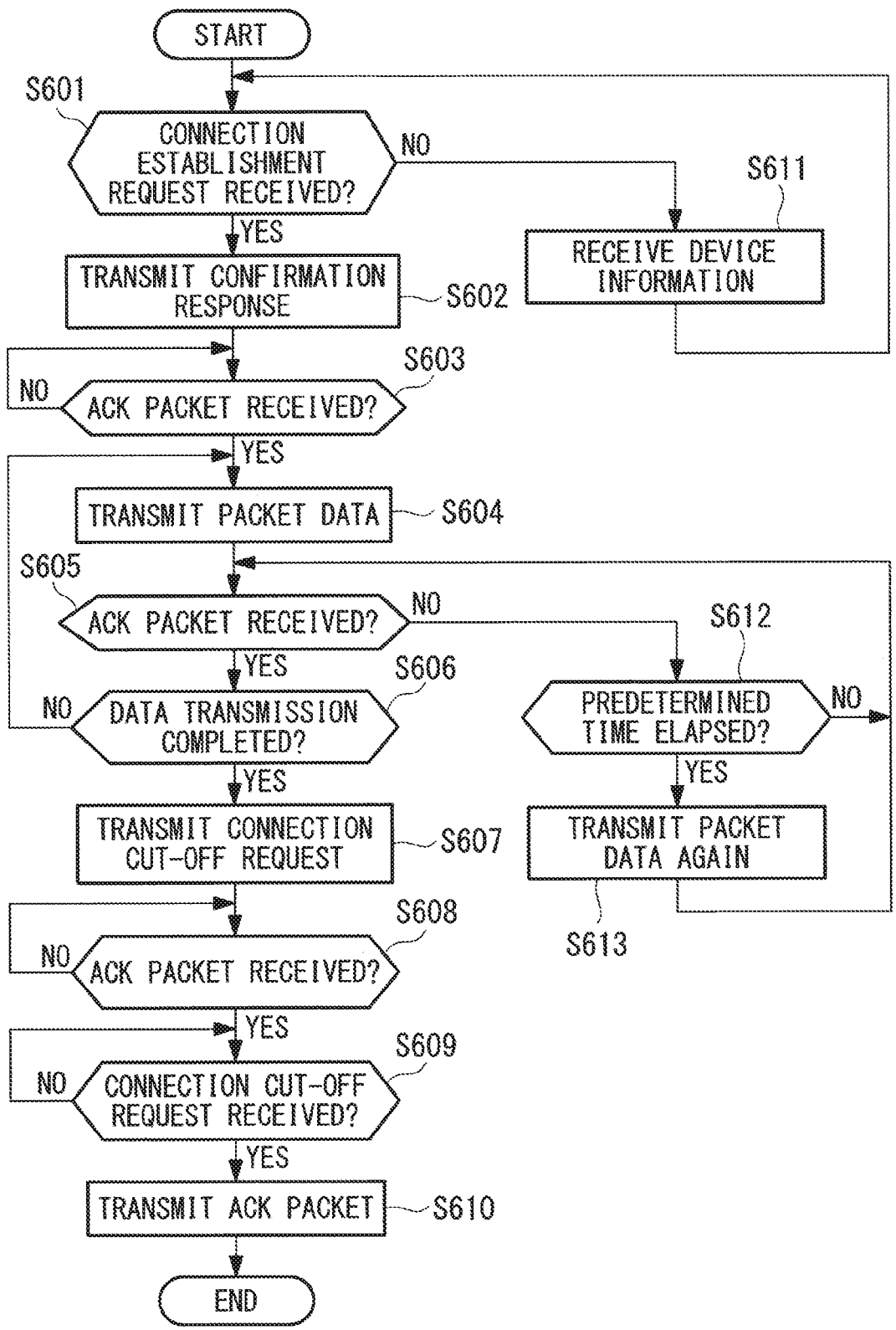
FIG. 6 is a flowchart showing processing carried out by the server unit in a case where data is transmitted from the server unit.

FIGS. 5 and 6 show communication processing that is performed between the server unit 200 and the electric mobility vehicle 100 in a case where data (e.g., the control program to be updated, drive parameters, and so forth) is transmitted from the server unit 200 to the electric mobility vehicle 100. FIG. 5 is a flowchart showing processing performed by the wireless communication unit 16 of the electric mobility vehicle 100, and FIG. 6 is a flowchart showing processing performed by the server unit 200.

Figure 7:
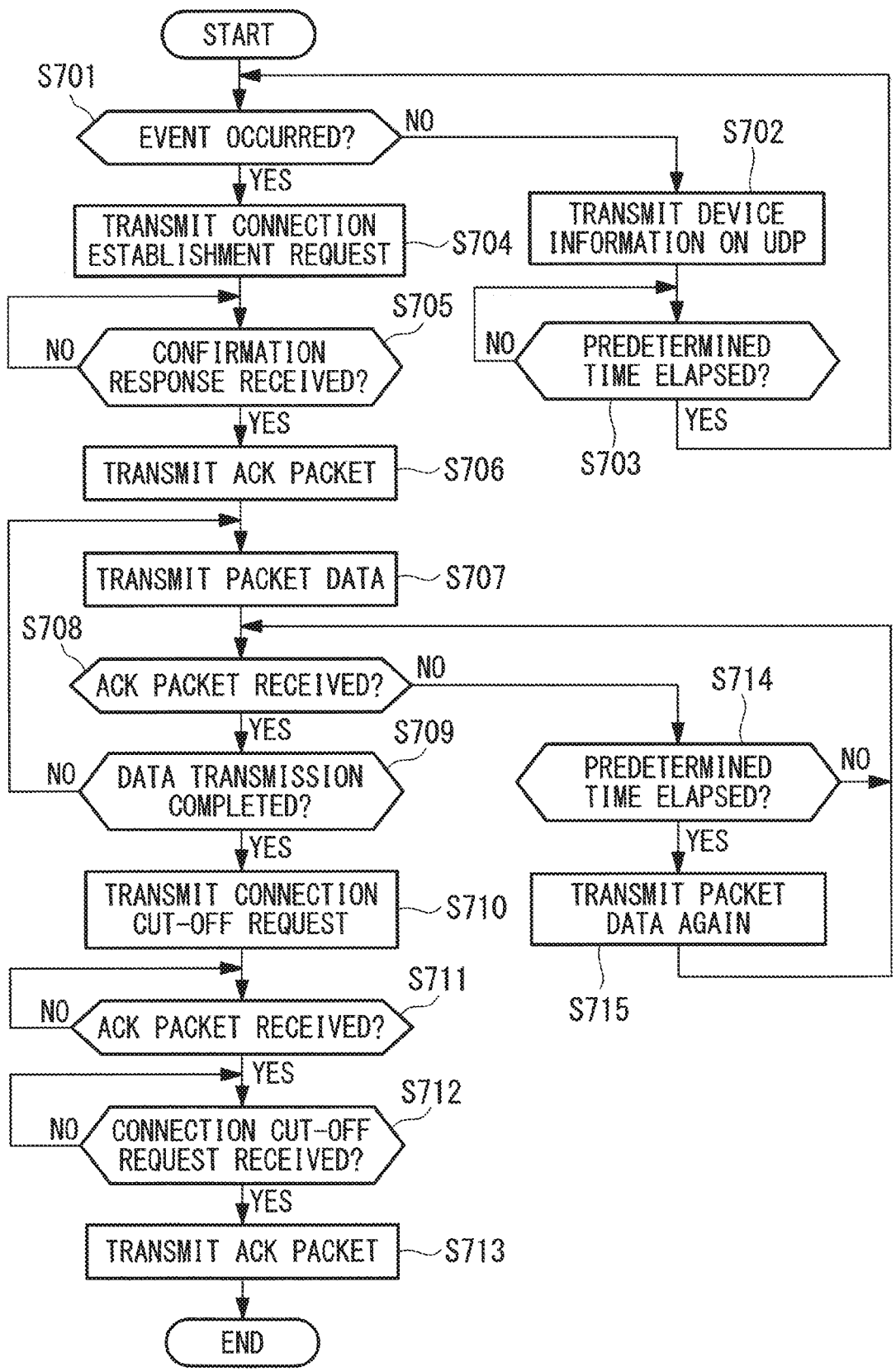
FIG. 7 is a flowchart showing processing carried out by the wireless communication unit of the electric mobility vehicle in a case where data is transmitted from the electric mobility vehicle.
Figure 8:
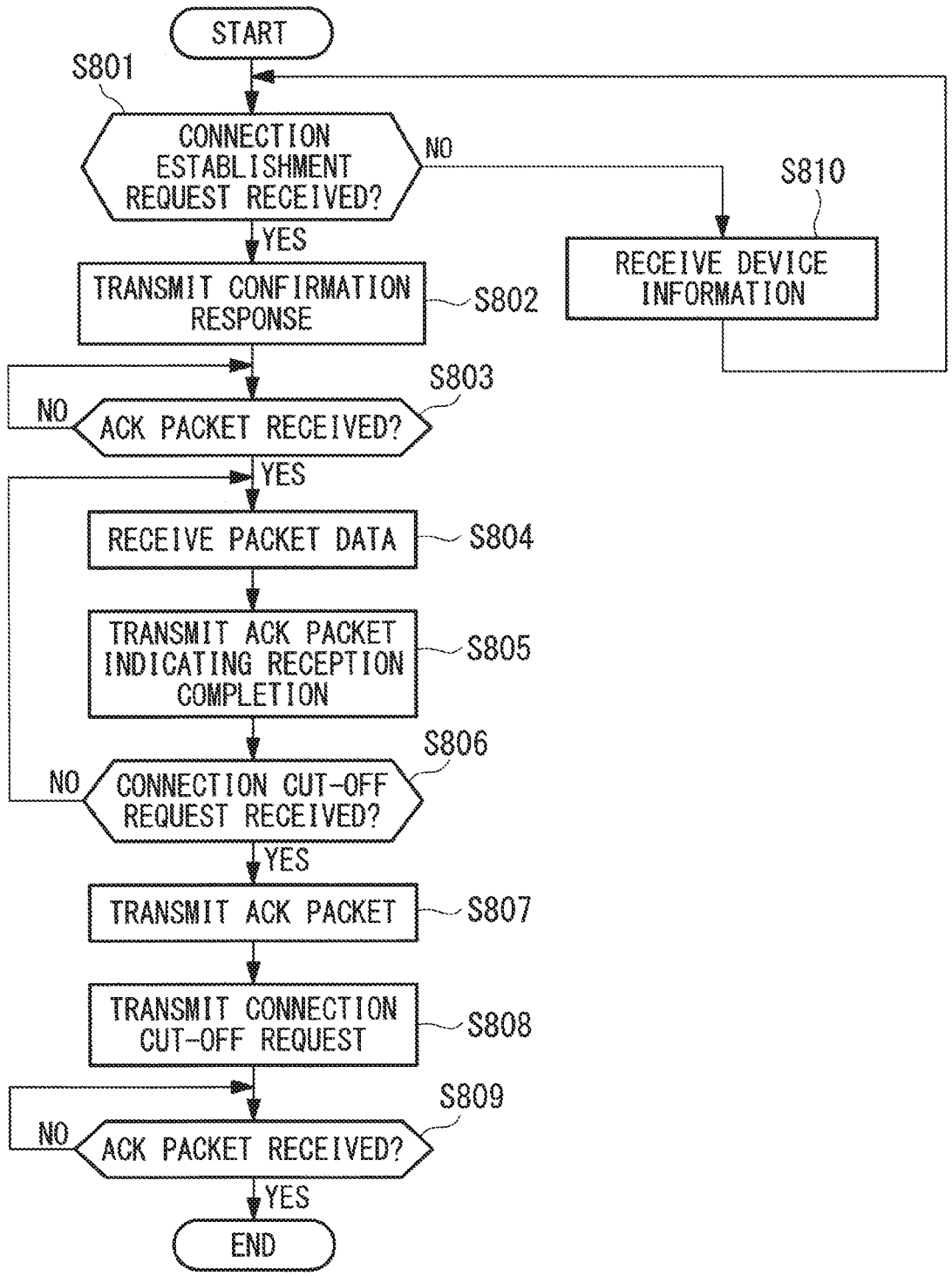
FIG. 8 is a flowchart showing processing carried out by the server unit in a case where data is transmitted from the electric mobility vehicle.

On the other hand, FIGS. 7 and 8 show communication processing performed between the server unit 200 and the electric mobility vehicle 100 in a case where data (e.g., drive parameters, various types of abnormalities that have occurred in the electric mobility vehicle 100, and so forth) are transmitted from the electric mobility vehicle 100 to the server unit 200. FIG. 7 is flowchart showing processing performed by the wireless communication unit 16 of the electric mobility vehicle 100, and FIG. 8 is a flowchart showing processing performed by the server unit 200.

First, processing performed by the electric mobility vehicle 100 in a case where data is transmitted from the server unit 200 to the electric mobility vehicle 100 will be described with reference to FIG. 5.

Each of the processes shown in FIG. 5 is a process that is executed when the processing unit 13 and the control unit 30 provided in the electric mobility vehicle 100 read out and execute the control program stored in a storage unit (not shown in the figure).

The control program can execute each of the processes shown in FIG. 5 by means of a computer composed of the processing unit 13 and the control unit 30. In addition, the function of the storage unit (storage medium) in which the control program is stored is realized by a memory (card-type memory, ROM, and so forth), a hard disk, an optical disk, or the like.

As shown in FIG. 5, in step S501, the wireless communication unit 16 queries the determination unit 13*d* about the result of determination as to whether or not an event for which TCP-based communication should be started (e.g., an event in which the power switch 19 is turned on) has taken place and confirms the result. The process proceeds to step S502 in the case of NO or to step S504 in the case of YES.

Note that when the process proceeds to step S502, the wireless communication unit 16 starts up the UDP processing unit 16*d* in order to use UDP as the communication protocol for the transport layer, or when the process proceeds to step S504, the wireless communication unit 16 starts up the TCP processing unit 16*c* in order to use TCP as the communication protocol for the transport layer.

In step S502, the wireless communication unit 16 uses UDP embodied in the UDP processing unit 16*d* and transmits, to the server unit 200 via the communication network 400, device information (e.g., position information detected by the position sensor 17) that has been acquired by the information acquisition unit 13*c* from each of the elements in the electric mobility vehicle 100.

Here, the wording "transmits to the server unit 200" means to add address information (destination information) for identifying the server unit 200 to the communication protocol header for the network interface layer implemented in the packet processing unit 16*b*.

In step S503, the wireless communication unit 16 determines whether or not a predetermined period of time has elapsed since the device information was transmitted in step S502. The process proceeds to step S501 when it is determined that the predetermined period of time has elapsed.

In step S501, the wireless communication unit 16 determines again whether or not an event for which TCP-based communication should be started has taken place, and the process proceeds to step S502 in the case of NO.

In this manner, when no events for which TCP-based communication should be started take place (NO in step S501), device information is transmitted to the server unit 200 by using UDP each time the predetermined period of time elapses (at predetermined intervals of time). Because the device information acquired by the wireless communication unit 16 from the information acquisition unit 13*c* in step S502 is the latest information at that time, the latest device information is transmitted to the server unit 200 at predetermined intervals of time by repeatedly executing step S502.

Note that while the process waits for the predetermined period of time to elapse in step S503 since the device information was transmitted, the wireless communication unit 16 shuts off or reduces the supply of power to the units other than a timer (not shown in the figure) for measuring the passing of the predetermined period of time, thus allowing itself to transit to a power save mode. In this case, when the timer measures the passing of the predetermined period of time, each of the units in the wireless communication unit 16 is started up to restore a normal power mode.

By shifting the wireless communication unit 16 to the power save mode, it is possible to reduce power consumption and thereby to save power until the predetermined period of time elapses (e.g., every five minutes, 30 minutes, one hour, and so forth) since the device information was transmitted.

In addition, the predetermined period of time (predetermined intervals of time) in step S503 can be set according to the state of power supply from the battery 18 to the moving mechanism 100*b*.

For example, a second predetermined interval of time (e.g., intervals of 30 minutes) in a non-movable state (second power supply state), in which no power is supplied from the battery 18 to the moving mechanism 100*b*, may be set to be longer than a first predetermined interval of time (e.g., intervals of one minute) in a movable state (first power supply state), in which the power switch 19 is turned on so that power is supplied from the battery 18 to the moving mechanism 100*b*. The predetermined interval of time in the non-movable state is set to be longer than the predetermined interval of time in the movable state because device information is less likely to change while the electric mobility vehicle 100 is in the non-movable state.

Note that, the predetermined interval of time, even in the movable state, may be set to be longer in a case where the battery 18 is being charged by the external power supply than in a case where the battery 18 is not charged by the external power supply. This is because the electric mobility vehicle 100 being charged by the external power supply is less likely to move, though it in fact is in the movable state.

In step S504, the wireless communication unit 16 transmits a connection establishment request to the server unit 200 on the basis of TCP embodied in the TCP processing unit 16*c* because an event for which TCP-based communication should be started has taken place.

In step S505, the wireless communication unit 16 determines whether or not a confirmation response in response to the connection establishment request has been received from the server unit 200, and the process proceeds to step S506 when it is determined that a confirmation response has been received.

In step S506, because the wireless communication unit 16 has received a confirmation response from the server unit 200 in response to the connection establishment request, the wireless communication unit 16 transmits, to the server unit 200, an ACK packet indicating the reception of the confirmation response.

As a result of the processing from steps S504 to S506 described above, a state in which a connection has established between the electric mobility vehicle 100 and the server unit 200 (ESTABLISHED) is entered.

In step S507, the wireless communication unit 16 receives packet data from the server unit 200.

In step S508, when the reception of the packet data is completed, the wireless communication unit 16 transmits, to the server unit 200, an ACK packet indicating completion of reception.

In step S509, the wireless communication unit 16 determines whether or not a TCP-based connection cut-off request has been received from the server unit 200, and the process proceeds to step S510 when the determination is YES or to step S507 when the determination is NO.

As a result of the processing from steps S507 to S509 described above, processing for receiving packet data from the server unit 200 is repeated until a TCP-based connection cut-off request is received from the server unit 200.

In step S510, because the wireless communication unit 16 has received a TCP-based connection cut-off request, the wireless communication unit 16 transmits, to the server unit 200, an ACK packet indicating the reception of a cut-off request.

In step S511, the wireless communication unit 16 transmits a TCP-based connection cut-off request to the server unit 200.

In step S512, the wireless communication unit 16 determines whether or not an ACK packet in response to the TCP-based connection cut-off request that has been transmitted to the server unit 200 has been received and ends the processing shown in FIG. 5 when the determination is YES.

As a result of the processing from steps S510 to S512 described above, a state where the connection between the electric mobility vehicle 100 and the server unit 200 is cut off (CLOSED) is entered.

Next, processing performed by the server unit 200 in a case where data is transmitted from the server unit 200 to the electric mobility vehicle 100 will be described.

In step S601, the server unit 200 determines whether or not a TCP-based connection establishment request has been received from the electric mobility vehicle 100, and the process proceeds to step S602 when the determination is YES or to step S611 when the determination is NO.

In step S611, because the server unit 200 does not receive a TCP-based connection establishment request from the electric mobility vehicle 100, the server unit 200 receives device information that is transmitted from the electric mobility vehicle 100 using UDP at predetermined intervals of time, and the process proceeds to step S601.

In step S602, because the server unit 200 has received a TCP-based connection establishment request from the electric mobility vehicle 100, the server unit 200 transmits, to the electric mobility vehicle 100, a confirmation response in response to the establishment request, and the process proceeds to step S603.

In step S603, the server unit 200 determines whether or not an ACK packet in response to the confirmation response transmitted in step S602 has been received from the electric mobility vehicle 100, and the process proceeds to step S604 in the case of YES.

Here, the wording "transmits to the electric mobility vehicle 100" means to add address information for identifying the electric mobility vehicle 100 to the communication protocol header for the network interface layer implemented in the server unit 200.

In step S604, as a result of the connection with the electric mobility vehicle 100 being established, the server unit 200 generates packet data by dividing data that should be transmitted to the electric mobility vehicle 100 (e.g., the control program to be updated, drive parameters, and so forth) and adding a necessary header and transmits the packet data to the electric mobility vehicle 100.

In step S605, the server unit 200 determines whether or not an ACK packet indicating that the electric mobility vehicle 100 has received the packet data transmitted in step S604 has been received from the electric mobility vehicle 100, and the process proceeds to step S606 in the case of YES or to step S612 in the case of NO.

In step S606, the server unit 200 determines whether or not data transmission has been completed as a result of there being no more data that should be transmitted to the electric mobility vehicle 100, and the process proceeds to step S607 in the case of YES or to step S604 in the case of NO.

Note that if the determination is NO in step S605, the server unit 200 determines whether or not a predetermined period of time has elapsed in step S612, and the process proceeds to step S613 in the case of YES.

In step S613, because the server unit 200 does not receive, from the electric mobility vehicle 100, an ACK packet in response to the packet data transmitted in step S604 even when a predetermined period of time elapses since the packet data was transmitted, the server unit 200 re-transmits, to the electric mobility vehicle 100, the packet data transmitted in step S604.

In step S607, because data transmission has been completed, the server unit 200 transmits a TCP-based connection cut-off request to the electric mobility vehicle 100.

In step S608, the server unit 200 determines whether or not an ACK packet in response to the connection cut-off request has been received from the electric mobility vehicle 100, and the process proceeds to step S609 if the determination is YES.

In step S609, the server unit 200 determines whether or not a TCP-based connection cut-off request has been received from the electric mobility vehicle 100, and the process proceeds to step S610 if the determination is YES.

In step S610, because a TCP-based connection cut-off request has been received, the server unit 200 transmits, to the electric mobility vehicle 100, an ACK packet indicating the reception of the cut-off request.

Next, processing performed by the electric mobility vehicle 100 in a case where data is transmitted from the electric mobility vehicle 100 to the server unit 200 will be described with reference to FIG. 7.

Note that steps S701 to S706 shown in FIG. 7 are the same as steps S501 to S506 shown in FIG. 5, and a description thereof will be omitted.

In step S707, because a connection with the server unit 200 has been established, the wireless communication unit 16 generates packet data by dividing data that should be transmitted to the server unit 200 (e.g., drive parameters, various types of abnormalities occurring in the electric mobility vehicle 100, and so forth) and adding a necessary header and transmits the packet data to the server unit 200.

In step S708, the wireless communication unit 16 determines whether or not an ACK packet indicating that the server unit 200 has received the packet data transmitted in step S707 has been received from the server unit 200, and the process proceeds to step S709 in the case of YES or to step S714 in the case of NO.

In step S709, the wireless communication unit 16 determines whether or not data transmission has been completed as a result of there being no more data that should be transmitted to the server unit 200, and the process proceeds to step S710 in the case of YES or to step S707 in the case of NO.

Note that if the determination is NO in step S708, the wireless communication unit 16 determines whether or not a predetermined period of time has elapsed in step S714, and the process proceeds to step S715 in the case of YES.

In step S715, because the wireless communication unit 16 does not receive, from the server unit 200, an ACK packet in response to the packet data transmitted in step S707 even when a predetermined period of time elapses since the packet data was transmitted, the wireless communication unit 16 re-transmits, to the server unit 200, the packet data transmitted in step S707.

In step S710, because data transmission has been completed, the wireless communication unit 16 transmits a TCP-based connection cut-off request to the server unit 200.

In step S711, the wireless communication unit 16 determines whether or not an ACK packet in response to the connection cut-off request has been received from the server unit 200, and the process proceeds to step S712 if the determination is YES.

In step S712, the wireless communication unit 16 determines whether or not a TCP-based connection cut-off request has been received from the server unit 200, and the process proceeds to step S713 if the determination is YES.

In step S713, because a TCP-based connection cut-off request has been received, the wireless communication unit 16 transmits, to the server unit 200, an ACK packet indicating the reception of the cut-off request.

As a result of the processing from steps S710 to S713 described above, a state where the connection between the electric mobility vehicle 100 and the server unit 200 is cut off (CLOSED) is entered.

Next, processing performed by the server unit 200 in a case where data is transmitted from the electric mobility vehicle 100 to the server unit 200 will be described with reference to FIG. 7.

Note that steps S801 to S803 and step S810 shown in FIG. 8 are the same as steps S601 to S603 and step S611 shown in FIG. 6, and hence a description thereof will be omitted.

In step S804, the server unit 200 receives packet data from the wireless communication unit 16.

In step S805, when the reception of the packet data is completed, the server unit 200 transmits, to the electric mobility vehicle 100, an ACK packet indicating completion of reception.

In step S806, the server unit 200 determines whether or not a TCP-based connection cut-off request has been received from the electric mobility vehicle 100, and the process proceeds to step S807 when the determination is YES or to step S804 when the determination is NO.

As a result of the processing from steps S804 to S806 described above, processing for receiving packet data from the electric mobility vehicle 100 is repeated until a TCP-based connection cut-off request is received from the electric mobility vehicle 100.

In step S807, because the server unit 200 has received a TCP-based connection cut-off request, the server unit 200 transmits, to the electric mobility vehicle 100, an ACK packet indicating the reception of the cut-off request.

In step S808, the server unit 200 transmits a TCP-based connection cut-off request to the electric mobility vehicle 100.

In step S809, the server unit 200 determines whether or not an ACK packet in response to the TCP-based connection cut-off request that has been transmitted to the electric mobility vehicle 100 has been received and ends the processing shown in FIG. 8 when the determination is YES.

As a result of the processing from steps S807 to S809 described above, a state where the connection between the electric mobility vehicle 100 and the server unit 200 is cut off (CLOSED) is entered.

In the above description, data transmission is performed only in one direction either from the electric mobility vehicle 100 to the server unit 200 or from the server unit 200 to the electric mobility vehicle 100 in a state where a connection is established as a result of the electric mobility vehicle 100 transmitting an establishment request based on connection-type communication (ESTABLISHED). However, another aspect is also acceptable.

For example, data transmission in both directions from the electric mobility vehicle 100 to the server unit 200 and from the server unit 200 to the electric mobility vehicle 100 may be performed during a single unit of connection from a state where a connection is established (ESTABLISHED) to a state where the connection is cut off (CLOSED).

Effects afforded by the above-described electric mobility vehicle 100 of this embodiment will be described below.

According to the electric mobility vehicle 100 of this embodiment, if no event for which TCP-based communication with the server unit 200 should be started has taken place, device information, including position information of the vehicle body 100a, is transmitted to the server unit 200 via the communication network 400 on the basis of UDP, and hence the device information can be transmitted to the server unit 200 with high efficiency.

In addition, due to a procedure for transmitting a connection establishment request from the electric mobility vehicle 100 to the server unit 200, the electric mobility vehicle 100 does not need to be set always ready for TCP-based communication in order to respond to a connection establishment request from the server unit 200. For this reason, sufficient power saving of the electric mobility vehicle 100 can be achieved, thereby reducing unwanted communication costs that are necessary for responding to the server unit 200.

In addition, the electric mobility vehicle 100 of this embodiment includes the battery 18 for supplying electric power to the moving mechanism 100b, and the determination unit 13d determines that the above-described event has taken place when the supply of power from the battery 18 to the moving mechanism 100b is started.

By doing so, when the supply of power from the battery 18 to the moving mechanism 100b is started so that a power-on state in which the electric mobility vehicle 100 is movable is entered, it is possible to confirm with the server unit 200, for example, whether or not there is data etc. that should be received from the server unit 200. In this case, because the electric mobility vehicle 100 is in the power-on state, the electric mobility vehicle 100, when receiving data from the server unit 200, can perform processing of the received data appropriately.

In addition, in the electric mobility vehicle 100 of this embodiment, the determination unit 13d determines that the above-described event has taken place when it becomes a predetermined clock time.

By doing so, because it is sufficient that the electric mobility vehicle 100 is placed into a state where the connection-type communication can be performed only at that predetermined clock time, sufficient power saving of the electric mobility vehicle 100 can be achieved.

Here, the predetermined clock time refers to, for example, one appointed clock time in a day, a clock time a certain period of time after the electric mobility vehicle 100 was switched to a power-off state, and so forth.

In the electric mobility vehicle 100 of this embodiment, the determination unit 13d determines that the above-described event has taken place when a predetermined abnormality has occurred.

By doing so, because it is sufficient that the electric mobility vehicle 100 is placed into a state where the TCP-based communication can be performed only when a predetermined abnormality, such as failure, of the electric mobility vehicle 100 occurs, sufficient power saving of the electric mobility vehicle 100 can be achieved.

In the electric mobility vehicle 100 of this embodiment, in a case where the determination unit 13d determines that the above-described event has not taken place, the wireless communication unit 16 transmits, to the server unit 200 at predetermined intervals of time, device information acquired by the information acquisition unit 13c.

By doing so, because device information is successively transmitted to the server unit 200 on the basis of UDP at predetermined intervals of time, the server unit 200 can acquire device information of the electric mobility vehicle 100 by receiving at least one of the successively transmitted items of device information.

In addition, the electric mobility vehicle 100 of this embodiment can include the battery 18 for supplying electric power to the moving mechanism 100b, and the wireless communication unit 16 can set the predetermined intervals of time according to the state of power supply from the battery 18 to the moving mechanism 100b.

By doing so, device information can be transmitted to the server unit 200 at appropriate intervals of time according to the state of power supply to the moving mechanism 100b.

In addition, in the electric mobility vehicle 100 of this embodiment, the wireless communication unit 16 may set the second predetermined interval of time in the non-movable state, in which no power is supplied from the battery 18 to the moving mechanism 100b, to be longer than the first predetermined interval of time in the movable state, in which power is supplied from the battery 18 to the moving mechanism 100b.

By doing so, device information can be transmitted at shorter intervals of time in a case where the electric mobility vehicle 100 is in a movable state than in a case where the electric mobility vehicle 100 is not in a movable state, thereby making it possible to notify the server unit 200 of position information of the electric mobility vehicle 100 with high accuracy.

Note that the determination unit 13d can be configured so as to determine that an event, for which communication based on the connection-type communication with the server unit 200 should be started, has taken place when the operation input unit 12 is operated.

Alternatively, the determination unit 13d may be configured so as to determine that the above-described event has taken place when a predetermined operation, which is not a normal operation, is input to the operation input unit 12. For example, a user can set an operation of moving the drive operating member 10a of the drive controller 10 of the operation input unit 12 to the left twice and then to the right three times as the above-described predetermined operation, and the determination unit 13d can be configured to determine that when this predetermined operation is performed, the above-described event has taken place.

In these cases, the wireless communication unit 16 of the electric mobility vehicle 100 receives data from the server unit 200, and, for example, the processing unit 13 stores the accepted data in a memory.

Note that an operation input to the operation input unit 12 that causes the determination unit 13d to determine that the above-described event has taken place includes an authentication input to an authentication information input unit, such as fingerprint authentication, provided in the electric mobility vehicle 100 and a predetermined operation applied to a portable terminal corresponding to the electric mobility vehicle 100.

In this case, because the operation input unit 12 is not only an operation input unit for starting communication based on the connection-type communication with the server unit 200 but also an operation input unit for performing other operations, the operation input unit 12 can be regarded as a multi-purpose operation input unit. Alternatively, the electric mobility vehicle 100 can be provided with a dedicated operation input unit (e.g., button) solely used for starting communication based on the connection-type communication with the server unit 200.

Figure 9:
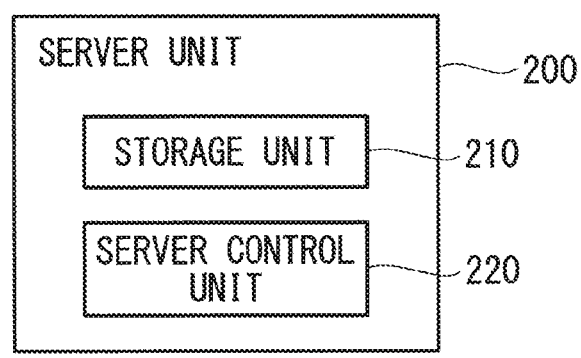
FIG. 9 is a block diagram showing a configuration of the server unit.

In addition, as shown in FIG. 9, the server unit 200 may be configured so as to be provided with a storage unit 210 and a server control unit 220, wherein the storage unit 210 stores data that should be transmitted to the electric mobility vehicle 100 by the connection-type communication, and when receiving predetermined data transmitted from a particular terminal, the server control unit 220 stores data based on that predetermined data in the storage unit 210 as the above-described data that should be transmitted.

As indicated in this embodiment, data that should be transmitted can be the control program, an updated program thereof, drive parameters such as an upper limit of the forward-moving speed, an upper limit of the forward-moving acceleration, and so forth, and various data regarding the control and operation of the electric mobility vehicle 100. The data that should be transmitted may also be, for example, lock release command data for shifting the electric mobility vehicle 100 from a lock state to an operable state. On the other hand, the above-described predetermined data is the above-described data itself that should be transmitted or data that serves as the basis for the above-described data that should be transmitted.

An example of the above-described particular terminal can include a terminal of a telephone operator. In this case, the telephone operator receives a call from a user and, for example, after confirming that the user is permitted to set drive parameters in a certain electric mobility vehicle 100, the telephone operator inputs, to that terminal, the set values of the drive parameters reported from that user. By doing so, those set values are stored in the storage unit 210, and the transmission of those set values is started when the above-described event takes place in that electric mobility vehicle 100. For example, if the user is a relative of the driver of the electric mobility vehicle 100, the relative can set drive parameters by taking the ability of the driver into account.

An example of the above-described particular terminal is a terminal possessed by a user, which is connected by logging into the server unit 200 via a predetermined application. In this case, the server control unit 220 of the server unit 200 accepts, for example, lock release request data that has been input to the terminal of the user and transmitted to the server unit 200 and then stores, in the storage unit 210, lock release command data for the corresponding electric mobility vehicle 100. For example, when the driver loses the key for releasing the lock, the lock can be released by sending the above-described data to the server unit 200 and causing the above-described events to take place.

Note that the server unit 200 may be configured so as to receive the above-described predetermined data input from a particular input device, such as a keyboard, directly connected to the server unit 200 and to store data based on that predetermined data in the storage unit 210 as the above-described data that should be transmitted.

OTHER EMBODIMENTS

In the above description, the transmission destination of device information transmitted by the wireless communication unit 16 in step S502 and the transmission destination of the connection establishment request transmitted by the wireless communication unit 16 in step S504 are the server unit 200. However, another aspect may be acceptable.

For example, if the maintenance system 500 is provided with another server unit (acquisition device), separately from the server unit 200, for acquiring device information from the plurality of electric mobility vehicles 100, the present invention may be realized in the form of a modification in which the transmission destination of device information transmitted by the wireless communication unit 16 in step S502 is that other server unit.

In this modification, the wording "the transmission destination of device information . . . is that other server unit" means to add address information (destination information) for identifying that other server unit to the communication protocol header for the network interface layer implemented in the packet processing unit 16b.

Even in this modification where the maintenance system 500 includes the other server unit for acquiring device information on the basis of connectionless-type communication (UDP) from the electric mobility vehicle 100, in addition to the server unit 200 for transmitting and receiving data on the basis of connection-type communication (TCP) with the electric mobility vehicle 100, the wireless communication unit 16 of the electric mobility vehicle 100 can transmit a connection establishment request and device information to the respective appropriate server units.

The inventors have arrived at the following aspects of the present invention.

A mobility vehicle according to a first aspect of the present invention includes: a moving mechanism which moves a vehicle body; an information acquisition unit which acquires device information including at least position information of the vehicle body; a communication unit capable of communicating via a communication network; and a determination unit which determines whether or not an event for which communication based on connection-type communication with an external device should be started has taken place, wherein the external device is connected to the communication network, wherein the communication unit transmits an establishment request for establishing a connection using the connection-type communication to the external device when the determination unit determines that the event has taken place, and the communication unit transmits, to the communication network, the device information acquired by the information acquisition unit using connectionless-type communication when the determination unit determines that the event has not taken place.

According to the mobility vehicle of the first aspect of the present invention, due to a procedure for transmitting the connection establishment request from the mobility vehicle to the external device, the mobility vehicle does not need to be set always ready for connection-type communication in order to respond to a connection establishment request from the external device. For this reason, sufficient power saving of the mobility vehicle can be achieved, and unwanted communication costs required to respond to the external device can be reduced.

In addition, if no event for which communication using connection-type communication with the external device should be started has taken place, device information including the position information of the vehicle body is transmitted to the communication network using connectionless-type communication, and hence, the device information can be transmitted with high efficiency.

In the mobility vehicle according to the first aspect of the present invention, the determination unit may determine that the event has taken place when an operation input unit provided in the mobility vehicle is operated.

By doing so, it can be confirmed whether or not there is, for example, data to be received from the external device with a simple operation of the operation input unit provided in the mobility vehicle, so that if there is such data, this data is acquired by the mobility vehicle.

In the mobility vehicle according to the first aspect of the present invention, the mobility vehicle may further include a power supply unit which supplies power to the moving mechanism, wherein the determination unit determines that the event has taken place when supply of power to the moving mechanism by the power supply unit is started.

By doing so, when the supply of power from the power supply unit to the moving mechanism is started to place the mobility vehicle into a power-on state where the mobility vehicle is movable, it is possible to confirm with the external device whether or not there is, for example, data to be received from the external device. In this case, the mobility vehicle is in a power-on state, and hence, when data is received from the external device, the received data can be processed appropriately.

In the mobility vehicle according to the first aspect of the present invention, the determination unit may determine that the event has taken place when it has become a predetermined clock time.

By doing so, because it suffices that the mobility vehicle is placed into a state where connection-type communication can be performed only at the predetermined clock time, sufficient power saving of the mobility vehicle can be achieved.

Here, the predetermined clock time refers to, for example, one appointed clock time in a day, a clock time a certain period of time after the mobility vehicle was switched to a power-off state, and so forth.

In the mobility vehicle according to the first aspect of the present invention, the determination unit may determine that the event has taken place when a predetermined abnormality has occurred.

By doing so, because it suffices that the mobility vehicle is placed into a state where connection-type communication can be performed only when a predetermined abnormality, such as failure, of the mobility vehicle occurs, sufficient power saving of the mobility vehicle can be achieved.

In the mobility vehicle according to the first aspect of the present invention, the mobility vehicle may be structured so that when the determination unit determines that the event has not taken place, the communication unit transmits the device information acquired by the information acquisition unit to the communication network with a predetermined interval of time.

According to the mobility vehicle with this structure, device information is successively transmitted to the communication network on the basis of connectionless-type communication at the predetermined intervals of time, and hence, device information of the mobility vehicle can be acquired by allowing an acquisition device for acquiring device information connected to the communication network to receive at least one of the successively transmitted items of device information.

In the mobility vehicle having the above-described structure, the mobility vehicle may be configured so as to further include a power supply unit which supplies power to the moving mechanism, wherein the communication unit sets the predetermined intervals of time according to a power supply state to the moving mechanism by the power supply unit.

According to the mobility vehicle having this configuration, device information can be transmitted to the communication network at appropriate intervals of time according to the state of power supply to the moving mechanism.

In the mobility vehicle having the above-described configuration, the communication unit may set the predetermined interval of time in a second type of the power supply state where power is not supplied from the power supply unit to the moving mechanism so that the predetermined interval of time in the second type of the power supply state is longer than the predetermined interval of time in a first type of the power supply state where power is supplied from the power supply unit to the moving mechanism.

By doing so, device information is transmitted at shorter intervals of time in a case where the mobility vehicle is in a movable state than in a case where the mobility vehicle is in a non-movable state, thereby making it possible to notify the acquisition device of position information of the mobility vehicle with high accuracy.

In the mobility vehicle according to the first aspect of the present invention, the mobility vehicle may further include a chargeable power supply unit which supplies power to the moving mechanism, wherein the device information may include information about remaining power that can be supplied to the moving mechanism by the power supply unit.

By doing so, the mobility vehicle can appropriately transmit information on the level of remaining power that can be supplied to the moving mechanism from the power supply unit of the mobility vehicle.

A mobility vehicle maintenance system according to a second aspect of the present invention includes: the above-described mobility vehicle; and a server unit as the external device which has a storage unit that stores data to be transmitted to the mobility vehicle using the connection-type communication, wherein the server unit transmits the data stored in the storage unit to the mobility vehicle upon receiving, from the mobility vehicle, the establishment request for a connection using the connection-type communication, wherein upon receiving predetermined data transmitted from a particular terminal or the predetermined data input from a particular input device, the server unit stores data based on the predetermined data in the storage unit as the data to be transmitted.

A server unit according to a third aspect of the present invention includes: a storage unit which stores data to be transmitted to a mobility vehicle using connection-type communication; and a server control unit which transmits the data stored in the storage unit to the mobility vehicle using the connection-type communication upon receiving, from the mobility vehicle, an establishment request for establishing a connection using the connection-type communication, wherein upon receiving predetermined data transmitted from a particular terminal or the predetermined data input from a particular input device, the server unit stores data based on the predetermined data as the data to be transmitted.

According to the aforementioned aspects, a mobility vehicle capable of achieving sufficient power saving and reducing communication cost can be provided.

REFERENCE SIGNS LIST

10 Drive controller
11 Speed controller
12 Operation input unit
13 Processing unit
13a Steering command output unit
13b Speed command output unit
13c Information acquisition unit
13d Determination unit
16 Wireless communication unit
16a Wireless unit
16b Packet processing unit
16c TCP processing unit
16d UDP processing unit
17 Position sensor
18 Battery (power supply unit)
19 Power switch
20 Front wheel
21 Rear wheel
21a Right drive wheel
21b Left drive wheel
22 Vehicle body frame
23 Seat
24, 25 Handle
30 Control unit
100 Electric mobility vehicle
100a Vehicle body
100b Moving mechanism
200 Server unit (external device)
300 Base station
400 Communication network
500 Maintenance system
A Axle

What is claimed is:

1. A mobility vehicle comprising:
a motor which moves a vehicle body;
a controller comprising a processing unit; and
a battery which provides electric power at least to the motor,
wherein the controller conducts:
an information acquisition process which acquires device information regarding the mobility vehicle;
a communication process capable of communicating via a communication network; and
a determination process which determines whether or not an event for which communication based on connection-oriented-type communication with an external device should be started has taken place, wherein the external device is connected to the communication network,
wherein the controller transmits, in the communication process, an establishment request for establishing a connection using the connection-oriented-type communication to the external device when the controller determines that the event has taken place in the determination process, and the controller transmits, in the communication process to the communication network, the device information acquired by the information acquisition process using connectionless-type communication when the controller determines that the event has not taken place in the determination process, wherein the controller determines that the event has taken place in at least one of the following cases: a case where the controller receives error information from the battery or a sensor provided in the vehicle; a case where matching identification information is input through an authentication unit provided in the mobility vehicle; a case where a predetermined operation is input on a portable terminal corresponding to the mobility vehicle; or a case where a predetermined operation, which is not one normally operated by a user to drive the mobility vehicle, is input on a control input unit, wherein the control input unit is provided in the mobility vehicle and the control input unit is configured to output signals for driving the motor to the controller.

2. The mobility vehicle according to claim 1, wherein when the controller determines that the event has not taken place in the determination process, the controller, in the communication process, transmits the device information acquired by the information acquisition process to the communication network with a predetermined interval of time.

3. The mobility vehicle according to claim 2, wherein the controller sets the predetermined interval of time according to a power supply state to the motor by the battery.

4. The mobility vehicle according to claim 3, wherein the controller sets the predetermined interval of time in a second type of the power supply state where power is not supplied from the battery to the motor so that the predetermined interval of time in the second type of the power supply state is longer than the predetermined interval of time in a first type of the power supply state where power is supplied from the battery to the motor.

5. The mobility vehicle according to claim 1, wherein the device information includes information about remaining power that can be supplied to the motor by the battery.

6. A mobility vehicle maintenance system comprising a mobility vehicle, wherein the mobility vehicle comprises:
a motor which moves a vehicle body; and
a controller comprising a processing unit,
wherein the controller conducts:
an information acquisition process which acquires device information regarding the mobility vehicle;
a communication process capable of communicating via a communication network; and
a determination process which determines whether or not an event for which communication based on connection-oriented-type communication with an external device should be started has taken place, wherein the external device is connected to the communication network,
wherein the controller transmits, in the communication process, an establishment request for establishing a connection using the connection-oriented-type communication to the external device when the controller determines that the event has taken place in the determination process, and the controller transmits, in the communication process to the communication network, the device information acquired by the information acquisition process using connectionless-type communication when the controller determines that the event has not taken place in the determination process, wherein the mobility vehicle maintenance system further comprises a server unit as the external device which has a storage unit that stores data to be transmitted to the mobility vehicle using the connection-oriented-type communication, wherein the server unit transmits the data stored in the storage unit to the mobility vehicle upon receiving, from the mobility vehicle, the establishment request for a connection using the connection-oriented-type communication, wherein upon receiving predetermined data transmitted from a particular terminal or the predetermined data input from a particular input device, the server unit stores data based on the predetermined data in the storage unit as the data to be transmitted.

7. A mobility vehicle maintenance system comprising a mobility vehicle, wherein the mobility vehicle comprises:
a motor which moves a vehicle body; and
a controller comprising a processing unit,
wherein the controller conducts:
an information acquisition process which acquires device information regarding the mobility vehicle;
a communication process capable of communicating via a communication network; and
a determination process which determines whether or not an event for which communication based on connection-oriented-type communication with an external device should be started has taken place, wherein the external device is connected to the communication network,
wherein the controller transmits, in the communication process, an establishment request for establishing a connection using the connection-oriented-type communication to the external device when the controller determines that the event has taken place in the determination process, and the controller transmits, in the communication process to the communication network, the device information acquired by the information acquisition process using connectionless-type communication when the controller determines that the event has not taken place in the determination process, wherein the mobility vehicle maintenance system further comprises a server unit as the external device which has a storage unit that stores data to be transmitted to the mobility vehicle using the connection-oriented-type communication, wherein the server unit transmits the data stored in the storage unit to the mobility vehicle upon receiving, from the mobility vehicle, the establishment request for a connection using the connection-oriented-type communication.

8. A server unit comprising:
a storage unit which stores data to be transmitted to a mobility vehicle using connection-type communication; and
a server control unit which transmits the data stored in the storage unit to the mobility vehicle using the connection-type communication upon receiving, from the mobility vehicle, an establishment request for establishing a connection using the connection-type communication,
wherein upon receiving predetermined data transmitted from a particular terminal or the predetermined data input from a particular input device, the server unit stores a control program of the mobility vehicle, an updated program of the mobility vehicle, drive parameters of the mobility vehicle, or a lock release command data for shifting the mobility vehicle from a lock state to an operable state as the data to be transmitted.

9. A mobility vehicle comprising:

a motor which moves a vehicle body; and a controller comprising a processing unit, wherein the controller conducts:

an information acquisition process which acquires device information regarding the mobility vehicle;

a communication process capable of communicating via a communication network; and a determination process which determines whether or not an event for which communication based on connection-oriented-type communication with an external device should be started has taken place, wherein the external device is connected to the communication network, wherein the controller transmits, in the communication process, a request to cause the external device to send a control program of the mobility vehicle, an updated program of the mobility vehicle, drive parameters of the mobility vehicle, or a lock release command data for shifting the mobility vehicle from a lock state to an operable state by establishing a connection using the connection-oriented-type communication to the external device when the controller determines that the event has taken place in the determination process, and the controller transmits, in the communication process to the communication network, the device information acquired by the information acquisition process using connectionless-type communication when the controller determines that the event has not taken place in the determination process.

* * * * *